United States Patent

Moriwake

Patent Number: 5,119,897
Date of Patent: Jun. 9, 1992

[54] MEANS FOR MOUNTING A SKIRT ON AN AIR CUSHION VEHICLE

[76] Inventor: Takumi Moriwake, 1444-24, Tsudaka, Okayama-shi, Okayama, Japan

[21] Appl. No.: 632,406

[22] Filed: Dec. 20, 1990

Related U.S. Application Data

[62] Division of Ser. No. 384,537, Jul. 25, 1989, abandoned.

[51] Int. Cl.$^5$ ................................. B60V 1/16
[52] U.S. Cl. ........................ 180/127; 180/128
[58] Field of Search .......... 180/121, 122, 123, 124, 180/127, 128, 129; 280/154, 768

[56] References Cited

U.S. PATENT DOCUMENTS

| | | | |
|---|---|---|---|
| 3,244,248 | 4/1966 | Prickett | 180/127 |
| 3,481,424 | 12/1969 | Barr | 180/128 |
| 3,511,331 | 5/1970 | Landry | 180/127 |
| 3,792,749 | 2/1974 | Krysiak | 180/127 |
| 3,871,476 | 3/1975 | Crowley | 180/127 |
| 4,215,757 | 8/1980 | Henry et al. | 180/127 |
| 4,339,017 | 7/1982 | Payne | 180/127 |
| 4,549,626 | 10/1985 | Korppoo et al. | 180/127 |

FOREIGN PATENT DOCUMENTS

| | | | |
|---|---|---|---|
| 2906920 | 8/1979 | Fed. Rep. of Germany | 180/127 |
| 2271782 | 12/1975 | France | 24/442 |
| 0128874 | 6/1987 | Japan | 180/127 |
| 186456 | 7/1989 | Japan | 180/127 |

Primary Examiner—Mitchell J. Hill
Attorney, Agent, or Firm—Browdy and Neimark

[57] ABSTRACT

The present invention relates to a method of mounting a skirt on an air cushion vehicle body in an air cushion vehicle (trade name, Hovercraft) to easily mount or dismount the skirt on the air cushion vehicle body and having the step of respectively mounting a pair of latch members for forming a surface adhesive fastener at the skirt mounting position and the skirt opening peripheral edge mounting position of the air cushion vehicle body, thereby easily mounting and dismounting the skirt.

4 Claims, 5 Drawing Sheets

MEANS FOR MOUNTING A SKIRT ON AN AIR CUSHION VEHICLE

This application is a divisional of application Ser. No. 07/384,537 filed Jul. 25, 1989, now abandoned.

BACKGROUND OF THE INVENTION

1. Field of the Invention

The present invention relates to a method of mounting a skirt to be mounted on the peripheral edge of an air cushion vehicle body at the vehicle body in an air cushion vehicle (trade name, Hovercraft).

2. Prior Art

The skirts of air cushion vehicles are generally classified into an annular skirt formed integrally as a whole, and split skirts divided into a number of skirt portions.

Any of these skirts is formed with an air cushion chamber upon reception of part of air stream generated by a driving fan. Thus, the skirt must be rigidly mounted on an air cushion vehicle body. A conventional method employs the steps of superposing the opening peripheral edge mounting portion of the skirt on the mounting portion of the air cushion vehicle body, retaining the top of the mounting portion by a retaining plate, and rigidly fastening the skirt with rivets or the like.

Since the skirt of the air cushion vehicle is swelled toward the lower peripheral edge of the air cushion vehicle body, the skirt tends to contact a foreign matter during its traveling and is easily damaged due to the engagement with the foreign matter. Thus, it is frequently necessary to repair or replace the skirt of the air cushion vehicle, and the skirt must be dismounted and mounted at every time. However, the easiness of dismounting and mounting the skirt is lacked according to the conventional method of fastening the skirt with the rivets.

SUMMARY OF THE INVENTION

Accordingly, an object of the present invention is to provide a method of mounting a skirt in an air cushion vehicle which eliminates the disadvantages of the conventional method and which can easily mount and dismount a skirt on an air cushion vehicle body.

The present inventor has aimed at a surface adhesive fastener which can be easily mounted and dismounted, and devised to easily mount and dismount the skirt on an air cushion vehicle body with the surface adhesive fastener to mount the skirt on the vehicle body. Thus, in order to achieve the above and other objects, there is provided according to the invention a method of mounting a skirt on an air cushion vehicle body in an air cushion vehicle comprising the steps of respectively mounting a pair of latch members for forming a surface adhesive fastener at the skirt mounting position and the skirt opening peripheral edge mounting position of the air cushion vehicle body, and mounting or dismounting the skirt by attaching or detaching the pair of latch members.

Other and further objects, features and advantages of the invention will appear more fully from the following description.

DESCRIPTION OF THE PREFERRED EMBODIMENTS

The most preferable embodiment of the present invention will be described in detail with reference to the accompanying drawings.

Figure 1:
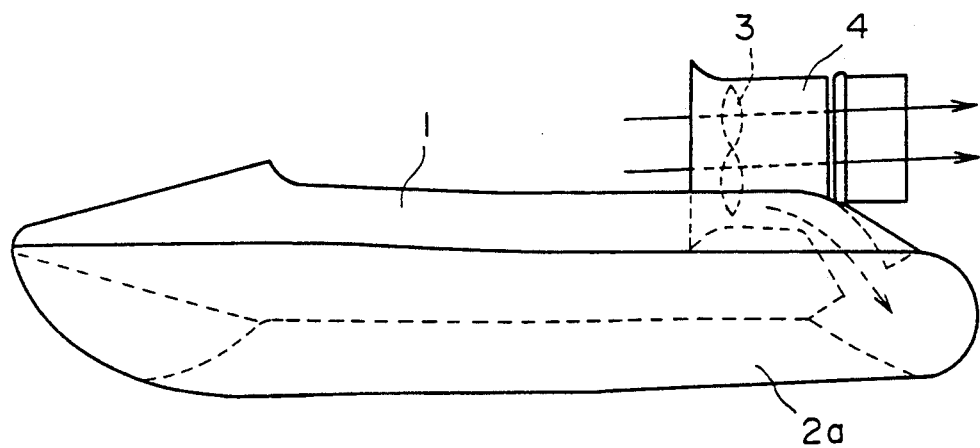
FIG. 1 is a side view of an embodiment of an air cushion vehicle in which an annular skirt is mounted according to the present invention.
Figure 2:
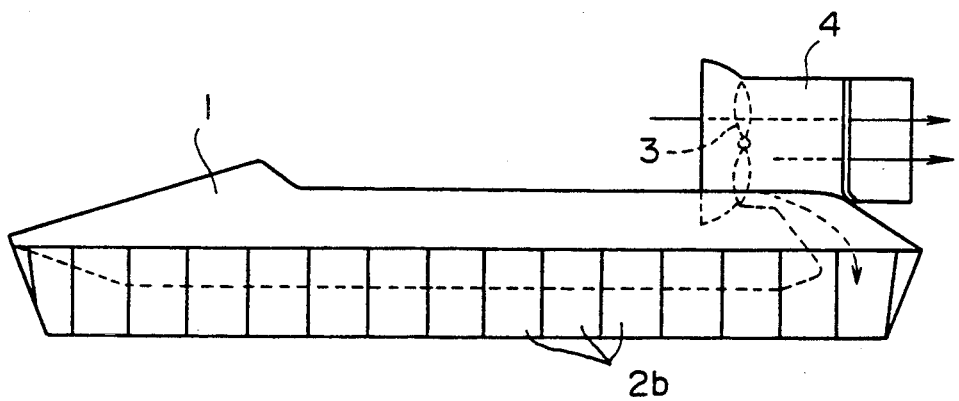
FIG. 2 is a side view of another embodiment of an air cushion vehicle in which split skirts are mounted according to the present invention.

An embodiment of the air cushion vehicle shown in the drawings is of small-scale type. In the drawings, reference numeral 1 denotes an air cushion vehicle body, and a skirt 2 containing air is mounted on an outer peripheral edge of the air cushion vehicle body 1. A skirt 2a shown in FIG. 1 is of an annular type formed integrally as a whole, and a skirt 2b shown in FIG. 2 is of a split type divided into a number of skirt segments. Numeral 3 denotes a fan driven by a vehicle engine, which fan is mounted in a propulsion fan duct 4 and disposed at the rear position of the air cushion vehicle body 1. The air cushion vehicle body 1 is traveled by the pressure of an air stream discharged from the propulsion fan duct 4 upon rotation of the fan 3. Further, part of the air stream discharged from the propulsion fan duct 4 is supplied to the skirt 2 provided on the outer peripheral edge of the air cushion vehicle body 1 as designated by an arrow in FIG. 1 thereby to expand the skirt 2, thereby floating or levitating the air cushion vehicle body 1 from the land or the sea. Numeral 5 denotes a surface adhesive fastener, which is formed of a pair of latch members 5a and 5b, one 5a of which has a number of hooks on its surface, and the other 5b of which has a number of loops on its surface as the fastener of the type that the hook latch member 5a is engaged with the loop latch member 5b each other to be coupled. This fastener is known, for example, as a magic fastener (trade name), and may employ any type in the construction in principle as described above in the embodiment of the present invention. The hook latch member 5a of one of the surface adhesive fastener 5 is provided on the skirt mounting position of the air cushion vehicle body 1, and the loop latch member 5b of the other of the surface adhesive fastener 5 is provided on the opening peripheral edge mounting position of the skirt 2, thereby constructing a pair of surface adhesive fasteners. In the embodiment in this specification, the symbol 5a denotes the hook latch member and the symbol 5b denotes the loop latch member. However, the invention is not limited to the particular embodiment. As another example, in the drawings, the symbol 5a denotes the loop latch member, and the symbol 5b denotes the hook latch member, thereby constructing a pair of surface adhesive fasteners.

Figure 3:
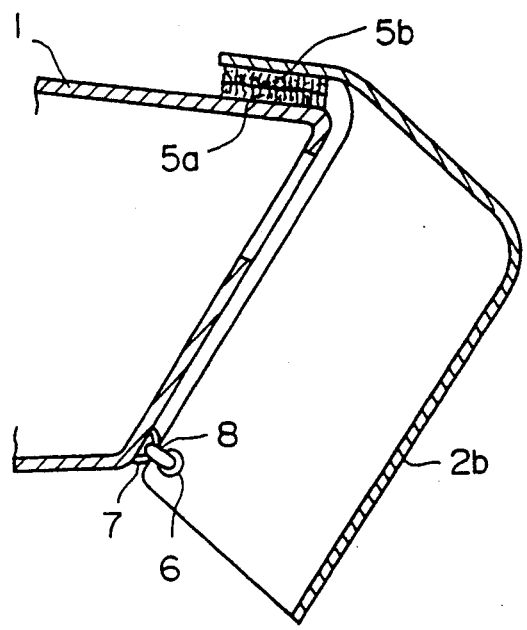
FIG. 3 is a longitudinal sectional view of an essential portion of the embodiment in which one of latch members of a surface adhesive fastener is mounted directly on the skirt mounting position of the air cushion vehicle body.

FIG. 3 shows another example of a surface adhesive fastener. In this case, one hook latch member 5a of the surface adhesive fastener provided on the skirt mounting position of the air cushion vehicle body 1 is mounted directed on the skirt mounting position of the air cushion vehicle body 1, and is engaged with the loop latch member 5b of the surface adhesive fastener provided on the upper opening peripheral edge of the split type skirt 2b of the air cushion vehicle body 1. Thus, the top of the split type skirt 2b is mounted on the air cushion vehicle body 1. A mounting hole 6 is formed at, the lower portion of the split type skirt 2b, a mounting string 8 is inserted through the mounting hole 6 and a mounting ring 7 provided at the opposite position of the air cushion vehicle body 1 to be coupled, thereby mounting the lower portion of the split type skirt 2b on the air cushion vehicle body 1.

Figure 4:
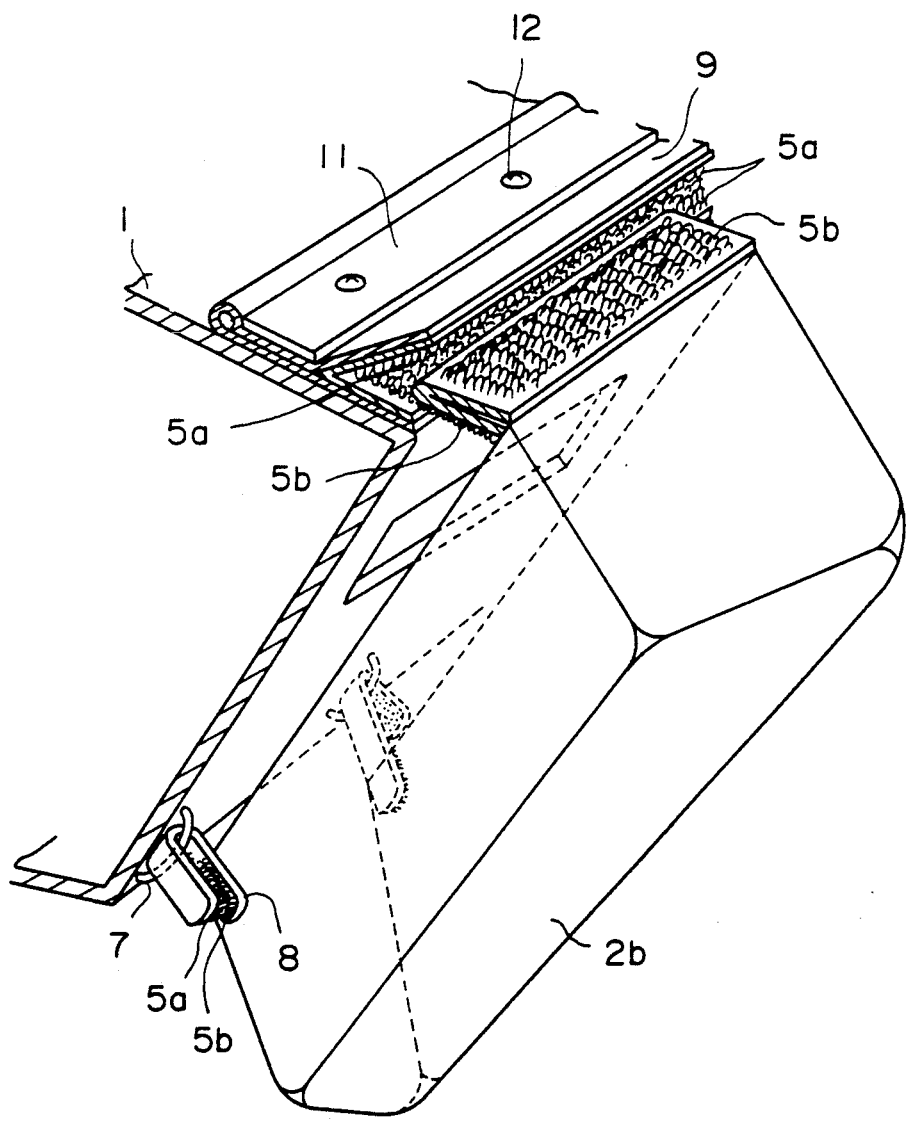
FIG. 4 is a perspective view of the embodiment in which one of the latch members of the surface adhesive fastener attached directly to the skirt mounting position of the air cushion vehicle body in FIG. 3 is provided in a folded state.

FIG. 4 shows still another example of a surface adhesive fastener. In this case, the base of a hook latch member 5a of a surface adhesive fastener mounted directly on the skirt mounting position of the air cushion vehicle body 1 is extended, and provided to be able to be folded. Numeral 9 denotes an auxiliary member for mounting the hook latch member 5a. In this case, loop latch members 5b of the surface adhesive fastener provided on the upper opening peripheral edge of the split type skirt 2b are provided on the upper and lower surfaces thereof, and and held by the hook latch members 5a to be able to be folded. Thus, the surface adhesive fasteners are latched on the upper and lower surfaces thereof, and the attachment of the upper portion of the split type skirt 2b to the air cushion vehicle body 1 becomes rigid. Further, the attachment of the lower portion of the split type skirt 2b to the air cushion vehicle body 1 by the steps of providing the hook latch member 5a and the loop latch member 5b of the surface adhesive fastener at both ends of the mounting string 8 in FIG. 3, mounting in advance the one end at the lower portion of the split type skirt 2b, inserting the other end of the string 8 to the mounting ring 7 provided on the air cushion vehicle body 1, and then latching the hook latch member 5a to the loop latch member 5b.

Figure 5:
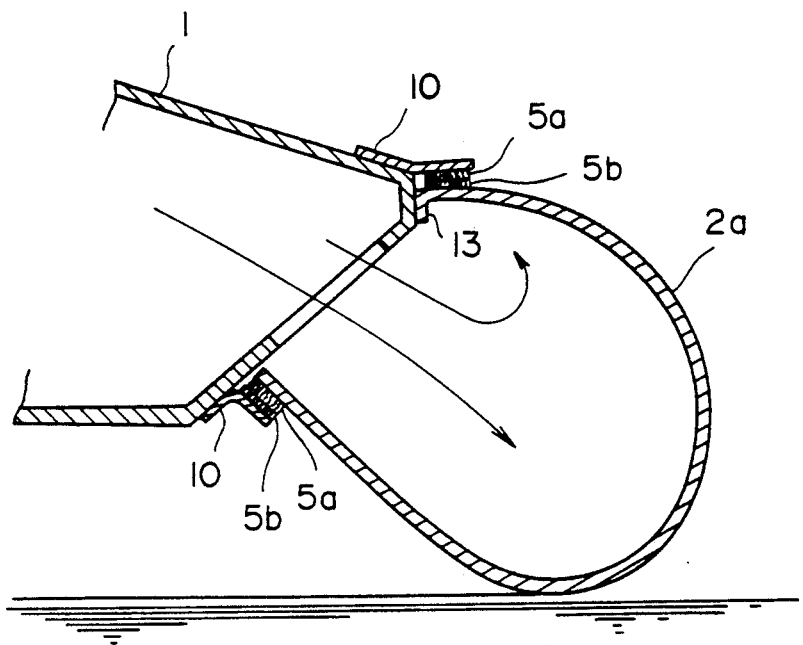
FIG. 5 is a longitudinal sectional view of an essential portion of the embodiment in which one of the latch members of the surface adhesive fastener is attached to the skirt mounting position of the air cushion vehicle body.
Figure 6:
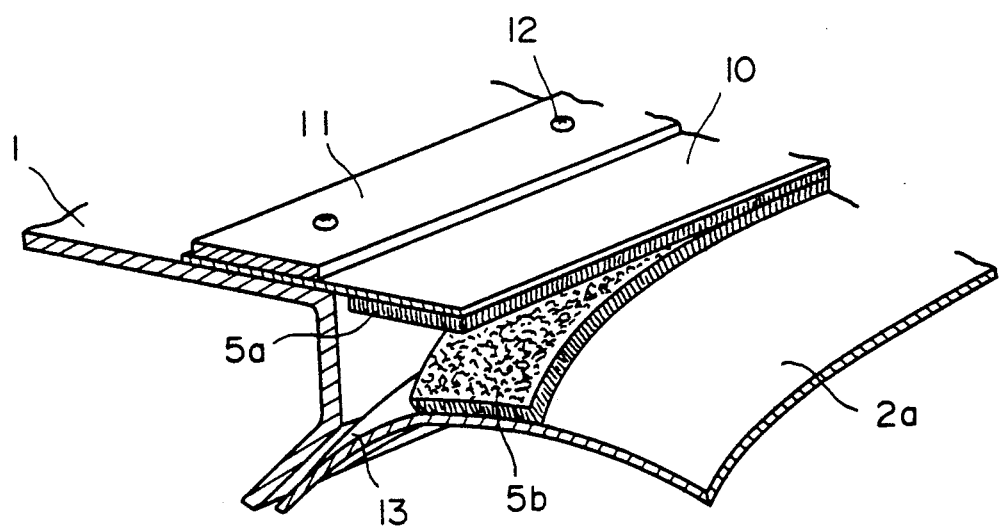
FIG. 6 is a perspective view showing the mounting state of the surface adhesive fastener in FIG. 5.

FIGS. 5 and 6 show still another example of a surface adhesive fastener. In this case, one hook latch member 5a of the surface adhesive fastener provided on the mounting position of the air cushion vehicle body 1 is mounted through a mounting piece 10 on the skirt mounting position of the air cushion vehicle body 1. The mounting piece 10 preferably has flexibility, and is made, for example, of cloth, synthetic resin film, leather, etc. The hook latch member 5a is provided at one side of the mounting piece 10, and the other side of the mounting piece 10 is mounted at the skirt mounting position of the air cushion vehicle body 1. The mounting of the mounting piece 10 may include the use of an adhesive, clamping of the mounting piece 10 through a retaining plate 11 with screws or rivets 12, or fastening by both. Or, the mounting piece 10 may be formed by extending a base cloth of the hook latch member 5a. With this arrangement, the loop latch member 5b of the surface adhesive fastener provided on the opening peripheral edge of the annular skirt 2a is latched with the hook latch member 5a provided through the mounting piece 10, thereby mounting the annular skirt 2a on the air cushion vehicle body 1. When the loop latch member 5b of the surface adhesive fastener is mounted on the air cushion vehicle body 1 and the annular skirt 2a is mounted through the mounting piece 10 thereon, pneumatic pressure supplied into the skirt is operated not in a direction of separating the surface adhesive fastener in which the latch members are latched with each other but in a direction of tensile shearing wherein longitudinal forces cause a sliding action between the surfaces of the adhesive fasteners thereby providing a more positive latching of the surface adhesive fasteners. Further, as a modified example, when the loop latch member 5b of the surface adhesive fastener is attached to the opening peripheral edge of the annular skirt 2a, an airtight piece 13 may remain in the opening end of the opening peripheral edge of the annular skirt 2a, and the loop latch member 5b may be attached thereto. In this case, the airtight piece 13 is pressed to the air cushion vehicle body 1 by means of pneumatic pressure applied in the skirt, thereby holding airtightness in the skirt. Since the pneumatic pressure is not applied laterally to the latch members of the surface adhesive fastener, the tentative separation of the latch members can be prevented.

Figure 7:
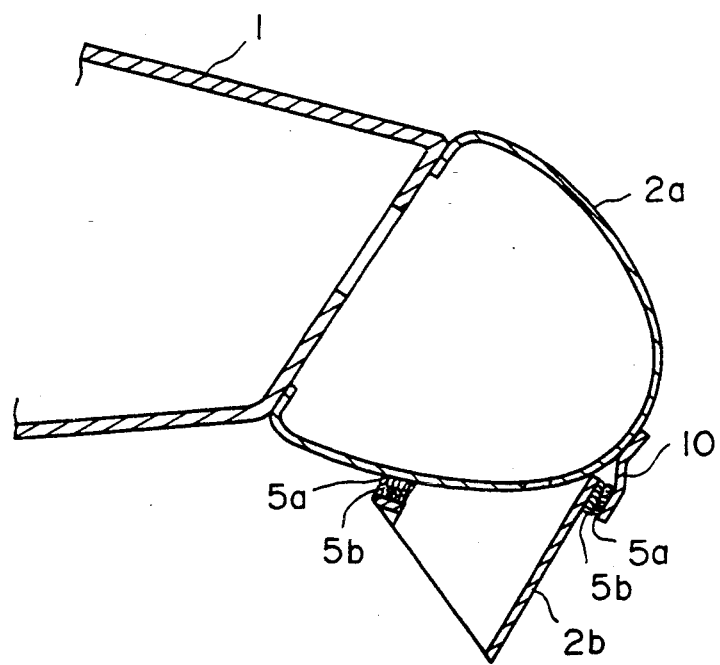
FIG. 7 is a longitudinal sectional view showing the state that the split type skirts are mounted at the lower section of the annular skirt.

FIG. 7 shows still another example of a surface adhesive fastener in such a manner that the lower portion of an annular skirt 2a is mounted at split skirts 2b.

In the embodiment shown in FIGS. 3 and 4 described above, the split skirts are employed. However, the invention is not limited to the particular embodiment. For example, annular skirts may be employed instead. In the embodiment shown in FIGS. 5 and 6, the annular skirts are employed. However, split type skirts may also be employed instead.

According to the embodiment of method of the present invention as described above, the surface adhesive fastener is employed to mount the skirt on the air cushion vehicle body. Accordingly, the skirt may be easily dismounted from and mounted on the air cushion vehicle body, thereby facilitating a repair, replacement of the skirt at the time of damaging the skirt.

According to another embodiment of the method as described above, the mounting piece is interposed when one latch member of the surface adhesive fastener is mounted on the skirt mounting position of the air cushion vehicle body. Accordingly, when the skirt is mounted by the engagement of the one latch member provided on the mounting piece with the other latch member provided at the opening peripheral edge of the skirt, the pneumatic pressure supplied into the skirt is operated not in the direction for separating the surface adhesive fastener in which the latch members are latched to each other but in a direction for tensile shearing the surface adhesive fastener. Thus, the strength of the surface adhesive fastener in principle can be performed, thereby rigidly mounting the skirt on the air cushion vehicle body.

Further, according to still another embodiment of the method as described above, the latch member of the surface adhesive fastener is mounted with the airtight piece remaining at the opening end of the opening peripheral edge of the skirt when the one latch member of the surface adhesive fastener is mounted at the opening peripheral edge of the skirt. Thus, when the opening peripheral edge of the skirt is mounted at the latch member of the air cushion vehicle body by the latch member, the airtight piece is pressed to the air cushion vehicle body by means of the pneumatic pressure applied in the skirt, thereby holding the airtightness in the skirt. Further, since the pneumatic pressure is not applied directly to the latch member of the surface adhesive fastener, the tentative separation of the latch members which are latched to each other can be prevented.

I claim:

1. A means for mounting attachment skirt on an air cushion vehicle body comprising:

a pair of latch members including a hook latch member and a loop latch member forming separable fastening fabrics;

one of said latch members mounted on the air cushion vehicle body before an edge for attachment of the skirt;

the other of said latch members mounted within a peripheral edge of the skirt;

said latch members positioned to receive a tensile shearing stress from the action of air flow on the skirt.

2. The attachment means for mounting a skirt in accordance with claim 1 further comprising:

additional latch members at a lower portion of the skirt also mounted to receive a tensile shearing stress from the action of air flow on the skirt.

3. The attachment means for mounting a skirt in accordance with claim 1 wherein at least one of said latch members is foldable and receivable between a surface of another of said latch members.

4. In an air cushion vehicle comprising a vehicle body (1), a downwardly depending skirt (2b, 2a) and attachment means for connecting said skirt to said body, the improvement wherein said attaching means comprises:

a pair of latch members including a hook latch member and a loop latch member forming separable fastening fabrics;

one of said latch members being mounted on said vehicle body;

the other of said latch members being mounted within a peripheral edge of said skirt; and said pair of latch members being positioned to receive a tensile shearing stress from the action of air flow on the skirt.

* * * * *